United States Patent [19]

Volk et al.

[11] 4,362,321
[45] Dec. 7, 1982

[54] DEVICE FOR PASSIVE ACTUATION OF A SAFETY BELT

[75] Inventors: Hans-Joachim Volk, Ebersdorf; Michael Forkel, Coburg, both of Fed. Rep. of Germany

[73] Assignee: Metallwerk Max Brose GmbH & Co., Coburg, Fed. Rep. of Germany

[21] Appl. No.: 213,916

[22] Filed: Dec. 8, 1980

[30] Foreign Application Priority Data

Dec. 21, 1979 [DE] Fed. Rep. of Germany ....... 2951880

[51] Int. Cl.³ .......................................... B60R 21/10
[52] U.S. Cl. ................................. 280/804; 280/808
[58] Field of Search ...................... 280/804, 802, 808

[56] References Cited

U.S. PATENT DOCUMENTS

| | | | |
|---|---|---|---|
| 4,061,365 | 12/1977 | Nagano | 280/804 |
| 4,220,355 | 9/1980 | Henderson | 280/804 |
| 4,236,730 | 12/1980 | Suzuki | 280/804 |
| 4,256,331 | 3/1981 | Schwanz | 280/804 |

Primary Examiner—Robert R. Song
Attorney, Agent, or Firm—Toren, McGeady & Stanger

[57] ABSTRACT

A device for passive actuation of a safety belt includes a motor-driven force transmission member. An engaging member for the safety belt can be connected to the force transmission member by a manually releasable pin member. The force transmission member moves the engaging member and with it the safety belt into a locked position. The locked position can be released automatically or manually. The engaging member can be moved manually along the force transmission member when the driving connection is released.

16 Claims, 4 Drawing Figures

DEVICE FOR PASSIVE ACTUATION OF A SAFETY BELT

SUMMARY OF THE INVENTION

The present invention is directed to a device for passive actuation of a safety belt and is an improvement over the following applications Ser. Nos. 138,119 now abandoned and 190,729 now U.S. Pat. No. 4,354,696. The basic subject matter involved is a device for the passive actuation of a safety belt by a motor driven, elongated force transmission member to which an engaging member of the safety belt is connected so that it can be moved by the force transmission member.

It is the primary object of the present invention to provide a device for the passive actuation of a safety belt of the type described in the above-mentioned applications which has a simple construction and guarantees a reliable function.

In accordance with the present invention, the connection between the engaging member and the force transmission member is releasable and the engaging member is constructed so that it can be manually slid along the force transmission member when the driving connection is released.

With the ability to release the driving connection, it is possible that the actuation of the safety belt can still be effected in the event of failure of the driving motor for the force transmission member or the failure of the current supply. After the release of the driving connection between the engaging member and the force transmission member which is blocked when the driving motor stops or is accessible only with difficulty, the engaging member can be moved manually along the force transmission for the placement or removal of the safety belt.

If a locking mechanism holds the engaging member in its end or locked position, it is helpful if the locking mechanism can be released manually. Since the locking mechanism is usually released automatically, specifically by the force transmission member, even if the driving motor fails to operate, it is possible to release the locking mechanism manually, especially for the removal of the safety belt.

A particularly simple releasable driving connection involves the coupling of the engaging memer to the force transmission member by a relesasable pin-hole connection.

In effecting such a connection, a pin is inserted into a borehole-like recess in the force transmission member for securing the engaging member. The pin can be disengaged from the recess in the force transmission member by a rocking lever mounted on the engaging member. Preferably, the rocking lever is a two-armed member. The rocking lever facilitates the manual release of the actuating connection. The reversal of the direction of the actuating force, effected by the rocking lever, is more advantageous in the intended use of the device for actuating a safety belt in a narrow space.

To avoid accidental or inadvertent operation of the rocking lever, it is advantageous if it is provided with a manually releasable catch which fixes the rocking lever to the engaging member.

Such a catch can be formed by a releasable screw for fixing the rocking lever to the engaging member or by means of a bayonet joint. In another advantageous arrangement, a locking bolt is axially slidably mounted in the rocking lever and is spring-biased into engagement with the engaging member.

In use, the two-armed locking lever is engaged at one end with the pin connecting the engaging member to the force transmission member and at its other end with the catch securing it to the engaging member. A catch installed in this position is easily accessible.

To afford the slidability of the engaging member when it is released from the force transmission member, the engaging member can be fitted into a guide section which assures adequate guidance for the engaging member when it is released.

Preferably, the force transmission member is formed of a polyester resin and has a circular cross-section and is supported in a longitudinally slotted guide section. The force transmission member is simple and economical to manufacture and is extremely strong while being sufficiently flexible. The recess in the force transmission member for receiving the connecting pin can be a simple borehole.

In application Ser. No. 190,729, a device for the passive actuation of a safety belt is disclosed including an elongated force transmission member, unyielding in tension and compression, to which an engaging member of a safety belt is connected by a locking mechanism or catch for fixing the safety belt. The connection of the engaging member of the force transmission member is provided with play in the longitudinal direction of the force transmission member. A release member is installed on the force transmission member in the region of the engaging member so that the locking mechanism can be released for uncoupling the engaging member.

In the drawing in this application, the play between the force transmission member and the engaging member is effected by providing a bolt, rigidly connected to the engaging member and penetrating into oblong holes in the force transmission member. Such oblong holes, however may tend to cause a structural weakening of the force transmission member.

In accordance with the present invention, to maintain the strength of the force transmission member as much as possible, the connection between the engaging member and the force transmission member is preferably in the form of a bolt rigidly secured in the force transmission member and engageable within an oblong cutout in the engaging member with the cutout extending in the longitudinal direction of the force transmission member. With such an arrangement the weakening of the engaging member due to the oblong cutout is maintained at a negligibly low level.

The pin or bolt detachably connecting the engaging member to the force transmission member can be used as the driving member. To afford the required play when using the above-mentioned rocking lever, it is suggested that the rocking lever be provided with an oblong cutout corresponding to the one in the engaging member.

Preferably, the end of the rocking lever engaging the pin is forked and enclosed the end of the pin spaced from the portion of the pin engageable in the force transmission member. The end of the pin engaged by the rocking lever has an enlarged head. Such an arrangement facilitates the manufacture and also the assembly of the rocking lever.

In a preferred embodiment, the engaging member includes a holding hook for interengagement with the locking mechanism. This hook guarantees that the high pulling forces which act on the safety belt during an accident are safely deflected through the locking mechanism to the body of the automobile.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 4 is a cross-sectional view of the release element taken along the line IV—IV in FIGS. 1 and 2.

DETAIL DESCRIPTION OF THE INVENTION

Figure 1:
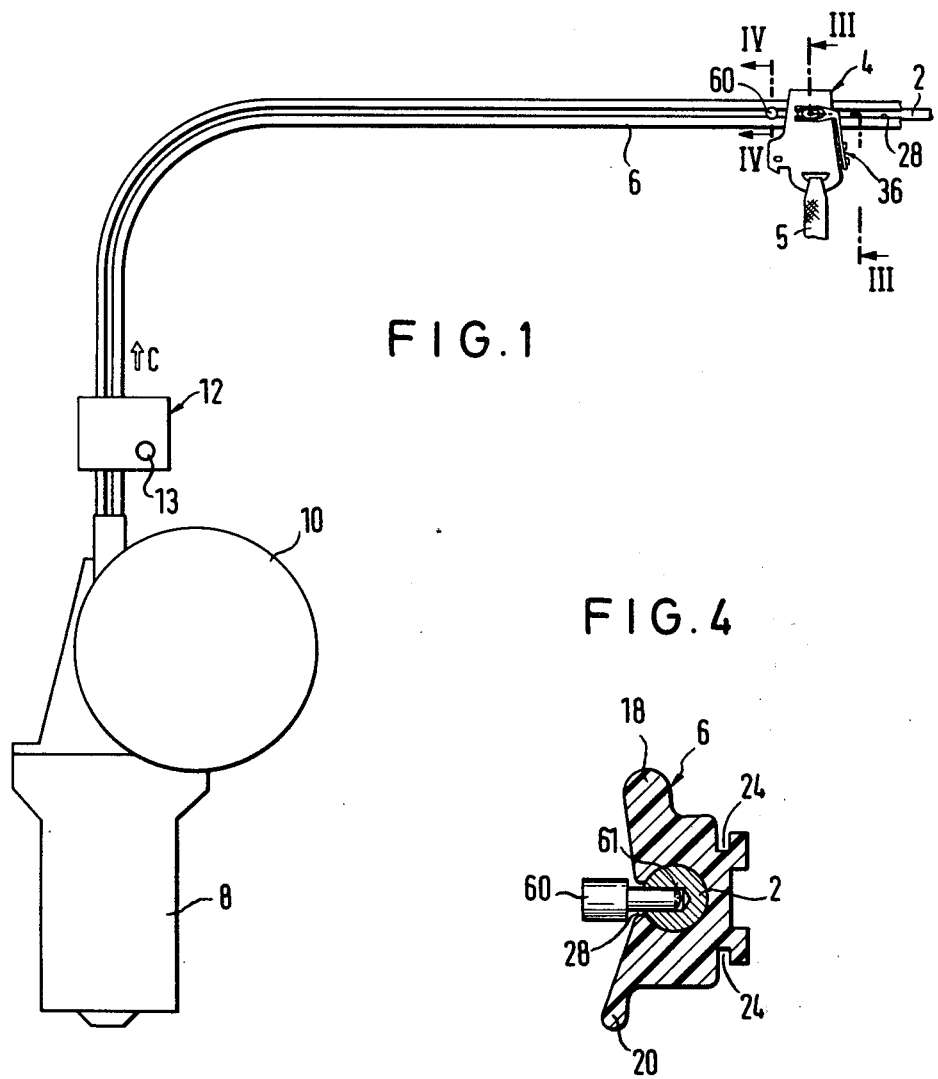
FIG. 1 is a schematic view of a device for the passive actuation of a safety belt embodying the present invention.

In FIG. 1 there is a schematic illustration of a device for the passive actuation of a safety belt for use in a motor vehicle. The device includes an elongated force transmission member 2, unyielding in tension and compression, with an engaging member 4, coupled to the force transmission member. The engaging member 4 is connected to a safety belt 5 of which only one end is shown. Force transmission member 2 is made of a solid polyester material and has a circular cross-section guided within a complementary shaped groove in an elongated guide section 6. The guide section is also formed of a polyester material. Force transmission member 2 is moved back and forth within the guide section 6 by winding roller 10 driven by a motor 8. Details of this arrangement can be found in German Offenlegungsschrift 21 56 926 in which there is also an example of the installation of such a device inside the door of a motor vehicle. Further, the device for the passive actuation of a safety belt can also be installed on the body of a motor vehicle, that is, above a door opening between an A column and a B column of the body of the vehicle.

In FIG. 1 the engaging member 4 is shown in an intermediate position, that is a position spaced from its locked position. When the safety belt 5 is automatically placed around a person sitting on a seat in the motor vehicle, the engaging member 4 connected to the belt is then moved into a left-end position on the guide section 6 by the motor-driven force transmission member 2. When moved to this end position, the engaging member is secured within a locking mechanism 12 which holds the engaging member in this end locked position. When the safety belt is to be released, the locking mechanism 12 automatically releases the engaging member and it is moved along the guide section 6 by the force transmission member 2 from its end locked position for removal of the safety belt 5.

If there is any interference with the operation of the device for the passive actuation of a safety belt which would tend to block the force transmission member or to cause its movement in the wrong direction, then the engaging member can be moved manaually independently of the blocked forced transmission member 2. Otherwise a person secured by the safety belt could only free himself from the seat with considerable difficulty if such a failure should occur. Therefore, the driving connection between the force transmission member and the engaging member is arranged to be releasable as shown in FIGS. 2 and 3.

Figure 2:
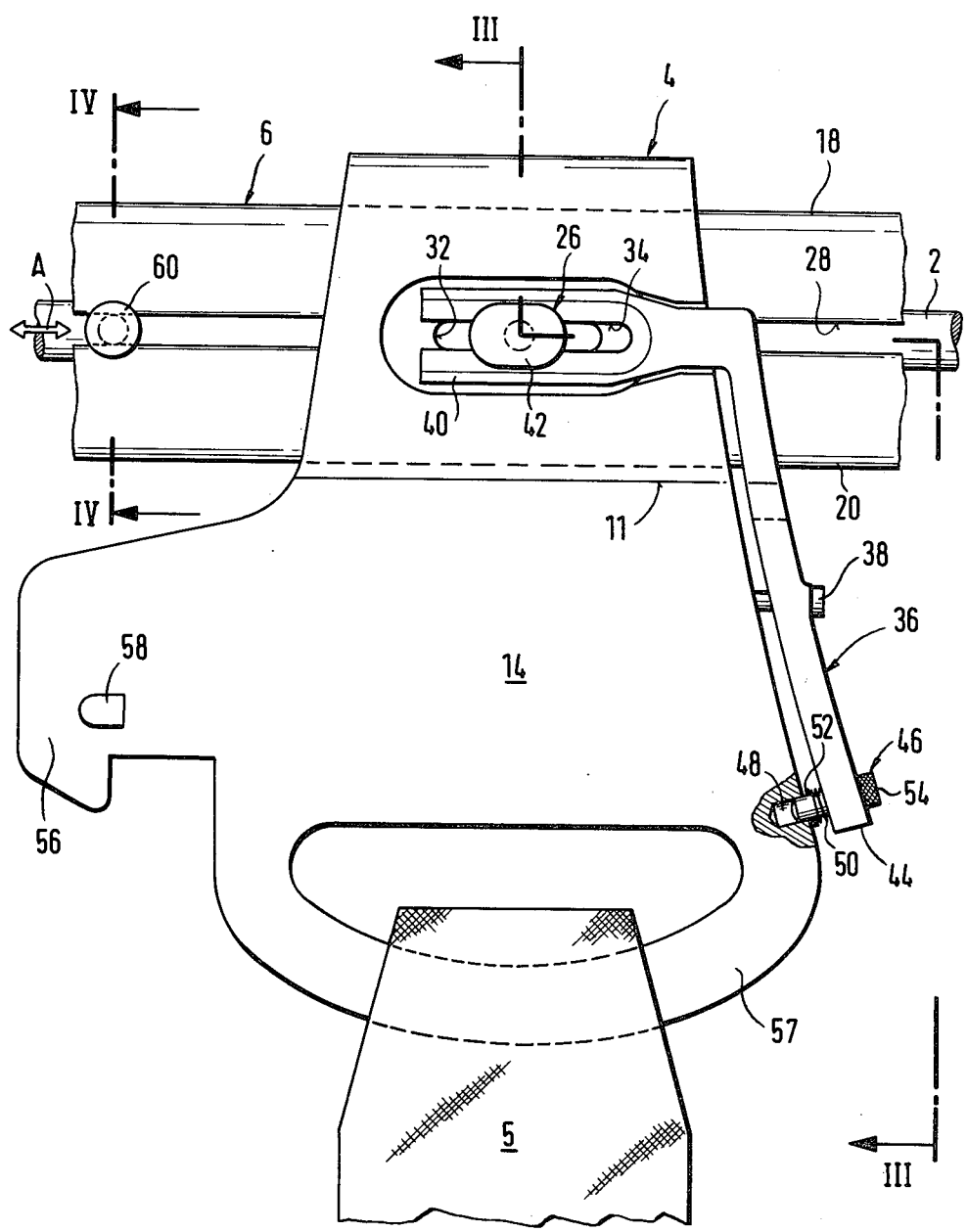
FIG. 2 is an enlarged plan view of a portion of the device illustrated in FIG. 1 displaying the engaging member and the force transmission member with its release element.
Figure 3:
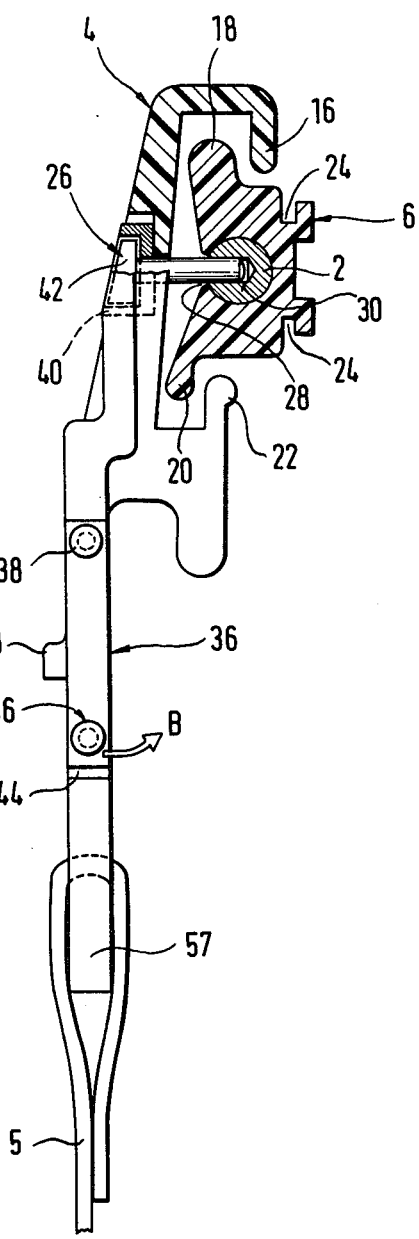
FIG. 3 is a side view, partly in section, of the engaging member coupled to the force transmission member taken along line III—III in FIGS. 1 and 2.

Engaging member 4 has a slightly bent base plate 14, note that bent edge 11 is parallel to the sliding direction A through the guide section 6 in FIG. 2. In FIG. 2 the upper edge of the base plate 14 terminates in a L-shaped bar 16, note FIG. 3. The L-shaped bar 16 fits around guide bulge 18, the upper guide bulge in FIG. 3, on the guide section 6. There is also a lower guide bulge 20 on the opposite side of the guide section 6 and another L-shaped bar 22 fits around this bulge in the region of the bent edge 11. For attachment to the body of an automobile, the guide section 6 is provided with fastening grooves 24, note FIG. 4, so that holding clamps, not shown, on the automobile body can be secured into the fastening grooves.

While the force transmission member 2 extends through the guide section 6 it is accessible on the exterior of the guide section via a slot 28 extending longitudinally through the guide section.

The driving connection between the force transmission member 2 and the engagng member 4 is afforded by a pin 26 inserted through the slot 28 into a blind borehole 30 extending transversely of the force transmission member. The pin 26 also extends through an oblong hole 32 in the base plate 14 of the engaging member and the hole is elongated in the direction A, note FIG. 2. As a result of the arrangement, the pin 26 can be moved back and forth with a certain amount of play within the engaging member 4 based on the length of the oblong hole 32. Further, the pin 26 penetrates an oblong cutout 34, corresponding to the oblong hole, and formed in a rocking lever 36 mounted on the engaging member 4. As viewed in FIG. 2, rocking lever 36 is mounted along the side or right-hand surface of the base plate 14 by a pivot axle 38 with the pivot axle being parallel to the direction A. As can be seen best in FIG. 2, the end 40 of the rocking lever is bent relative to the part extending along the side of the base plate 14, and extends in the direction A. End 40 is bifurcated forming the cutout 34 which fits under an approximately oval head 42 on the pin 26. The oval head 42 is enlarged relative to the diameter of the pin. Therefore, when the two-armed rocking lever is pivoted at its lower end 44 in the direction B of FIG. 3, the upper end 40 of the rocking lever 36 exercises a lifting or withdrawing force on the pin 26. If the pivoting force acting on the rocking lever 26 is sufficiently high, the pin 36 is pulled out of the borehole 30 in the force transmission member 2 and the driving connection is released.

To prevent any inadvertent pivotal movement of the rocking lever 36 which might cause the release of the driving connection, the lower end 44 of the rocking lever supports an axially slidable locking bolt engageable with a corresponding bore 48 in the side surface of the base plate 14. Locking bolt 46 is biased by a spring 50 into the bore 48. The biasing spring 50 is clamped between the end 44 of the rocking lever 36 and pins 52 projecting radially outwardly from the locking bolt 46. To release the rocking lever 36 for pivotal movement, it is only necessary to pull the locking bolt 46 outwardly from the bore 48 by grasping its knurled bolt head 54.

As can be seen from FIGS. 2 and 3, rocking lever 36 is provided with a double bend in that portion between the pivot axle 38 and the upper end 40 for adjustment to the bent portion of the base plate 14.

As shown in the lower portion of FIG. 2, the base plate 14 is provided with a slightly bent shackle 57 for connecting the safety belt 5 to the engaging member 4. In addition, a holding hook 56 with a small hook-like projection 58 is formed on the base plate 14 on the opposite side from the rocking lever 36. When the safety belt is secured in the end or locked position, the holding hook 56 as well as the projection 58 engage in the locking mechanism 12, shown only schematically in FIG. 1, and are held in the locking mechanism. Accordingly, the pulling action occurring during an accident can be transferred by this arrangement directly via the locking mechanism 12 to the body of the automobile. As described in application Ser. No. 190,729, the release mechanism is automatically released when the safety belt is intended to be released. The releasing action takes place by means of a release element 60 rigidly fixed to the force transmission member 2. Note the release element shown in FIGS. 1 and 2. As illustrated in FIG. 4, release element 60 is in the form of a bolt inserted into a blind borehole 61 extending into and transversely of the force transmission member 2. To release the locking mechanism 12 when the safety belt 5 is to be released, the force transmission member 2 moves the release element 60 which, at this time, is located within the locking element 12 in the direction C and this movement is not repeated by engaging member 4 which remains locked, because of the clearance or play between the engaging member 4 and the force transmission member 2 due to the elongated slot. The locking mechanism 12 is automatically released during this movement of the release element, and the engaging member is released. During continued movement of the force transmission member in the direction C, after the play the engaging member has been taken up by the pin 26 in the force transmission member 2, the safety belt can be removed from the person wearing it.

It is also possible to provide for the manual release of the locking mechanism 12. A release key 13, shown schematically in FIG. 1, affords this feature. Accordingly, the locking mechanism can be released in the event of a defect in the actuating device or during failure of the power supply thereby permitting the engaged safety belt to be removed from the locked position.

While specific embodiments of the invention have been shown and described in detail to illustrate the application of the inventive principles, it will be understood that the invention may be embodied otherwise without departing from such principles.

What is claimed is:

1. Device for the passive actuation of a safety belt, comprising a motor driven elongated force transmission member, an engaging member for a safety belt engageable with and movable by said force transmission member, wherein the improvement comprises means for forming a driving connection between said engaging member and said force transmission member, said connection means being releasable, and said engaging member being shaped to be slid manually along said force transmission member when said connecting means is released, connecting means comprising a member releasably coupled within said force transmission member, said member comprises a pin, a borehole formed in said force transmission member and extending transversely of the longitudinal direction thereof and said pin passing through said engaging member, and a rocking lever pivotally attached to said engaging member and engageable with said pin for disengaging said pin from said borehole in said force transmission member.

2. Device, as set forth in claim 1, wherein said engaging member being movable into a locked position by said force transmission member, a locking mechanism for securing said engaging member in the locked position, and said locking mechanism being manually releasable.

3. Device, as set forth in claim 1, including a lock securing said rocking lever to said engaging member and said lock being releasable for pivotally displacing said rocking lever.

4. Device, as set forth in claim 3, wherein said lock comprises a releasable screw fastening said rocking lever to said engaging member.

5. Device, as set forth in claim 3, wherein said lock comprises a releasable bayonet joint fastening said rocking lever to said engaging member.

6. Device, as set forth in claim 3, wherein said lock comprises a spring biased bolt axially slidable into a bore in said engaging member so that by pulling said bolt against the biasing action said rocking lever can be released from said engaging member.

7. Device, as set forth in claim 3, wherein said rocking lever being two-armed and having a first end and a second end with said rocking lever being pivotally mounted on said engaging member intermediate said first and second ends, said first end of said rocking lever being engageable with said pin and said second end of said rocking lever including said releasable lock.

8. Device, as set forth in claim 1, including an elongated guide section, said force transmission member extending through and being movable through said elongated guide section, said engaging member being shaped to interfit with said guide section for movement therealong.

9. Device, as set forth in claim 8, wherein said force transmission member being formed of a polyester resin and having a circular transverse cross-section, said guide section having an elongated recess therethrough complementary to said force transmission member, and said guide section being longitudinally slit for affording access through the slit from the exterior thereof to said force transmission member located therein.

10. Device, as set forth in claim 1, wherein said pin being disposed in form fitting engagement within the borehole in said force transmission member and extending through an elongated slot in said engaging member so that said engaging member can be moved for a certain length relative to said pin, a release element positioned in said force transmission member adjacent said engaging member, said release element being movable into locking engagement within said locking mechanism when said engaging member is moved into the locked position.

11. Device, as set forth in claim 10, wherein said rocking lever having an elongated cutout therein corresponding to the elongated hole in said engaging member and said pin extending through said cutout in said locking lever.

12. Device, as set forth in claim 11, wherein said rocking lever having one end formed in a forked shape forming said elongated cutout, said pin having an enlarged head, and said cutout in the end of said rocking lever engaging said pin below said head for displacing said pin from said engagement with the borehole in said force transmission member when said rocking lever is pivoted relative to said engaging member.

13. Device, as set forth in claim 2, wherein said engaging member including a holding hook interacting with said locking mechanism for transmitting forces acting on the safety belt through the locking mechanism to the body of a motor vehicle.

14. Device, as set forth in claim 4, wherein said force transmission member arranged to be mounted in the body of a motor vehicle above a door opening therein between a pair of columns in the body of the vehicle.

15. Device for the passive actuation of a safety belt comprising an elongated force transmission member (2) unyielding in tension and compression, an elongated guide section (6) and said force transmission member is longitudinally slidable in said guide section, an engaging member (4) arranged to receive one end of a safety belt, said engaging member (4) is shaped to be longitudinally slidable along said guide section, manually actuatable connecting means (36) supported on said engaging member for detachably connecting said engaging member with said force transmission member, said connecting means including a manually releasable locking bolt (46) releasably engageable with said engaging member whereby said locking bolt must be released from said engaging member so that said engaging member can be released from said force transmission member by actuating said connecting means.

16. Device for the passive actuation of a safety belt comprising an elongated force transmission member (2) unyielding in tension and compression, an elongated guide section (6) and said force transmission member is longitudinally slidable in said guide section, an engaging member (4) arranged to receive one end of a safety belt, said engaging member is shaped to be longitudinally slidable along said guide section, a locking mechanism (12) mounted on said guide section, said engaging member including a holding means (56, 58) releasably engageable with said locking mechanism, said engaging member having an oblong hole (32) therein extending in the elongated direction of said force transmission member, a pin (26) mounted in the oblong hole in said engaging member and releasably engageable with said force transmission member, a release element (60) fixed to said force transmission member, said release element located within said locking mechanism when said engaging member is locked to said locking mechanism and movement of said force transmission member from the locked position of said engaging member and locking mechanism and away from said locking mechanism releases said locking mechanism.

* * * * *